United States Patent [19]
Kato et al.

[11] Patent Number: 5,603,877
[45] Date of Patent: Feb. 18, 1997

[54] METHOD FOR PREPARING SILICON NITRIDE BASED CERAMICS

[75] Inventors: Hideki Kato, Ichinomiya; Junichiro Suzuki, Gifu-ken, both of Japan

[73] Assignee: NGK Spark Plug Co., Ltd., Aichi, Japan

[21] Appl. No.: 432,003

[22] Filed: May 1, 1995

Related U.S. Application Data

[63] Continuation of Ser. No. 173,950, Dec. 28, 1993, abandoned, which is a continuation of Ser. No. 827,110, Jan. 30, 1992, abandoned.

[30] Foreign Application Priority Data

Jan. 30, 1991 [JP] Japan ................................. 3-027641

[51] Int. Cl.⁶ .............................................. C04B 35/584
[52] U.S. Cl. ................................. 264/65; 501/95; 501/97
[58] Field of Search ............................... 264/65; 501/95, 501/97

[56] References Cited

U.S. PATENT DOCUMENTS

| | | | |
|---|---|---|---|
| 4,289,952 | 9/1981 | Haggerty | 501/97 |
| 4,886,767 | 12/1989 | Goto | 501/98 |
| 4,978,645 | 12/1990 | Ukyo | 501/98 |
| 5,045,513 | 9/1991 | Mizuno | 501/97 |
| 5,120,328 | 6/1992 | Pyzik | 501/97 |
| 5,225,127 | 7/1993 | Nishioka et al. | 264/65 |

FOREIGN PATENT DOCUMENTS

| | | |
|---|---|---|
| 0282376 | 9/1988 | European Pat. Off. . |
| 59-54677 | 3/1984 | Japan . |
| 61-274803 | 12/1986 | Japan . |

OTHER PUBLICATIONS

P. Sajgalik, Journal of the European Ceramic Society, "Reinforcement of Silicon Nitride Ceramics by $\beta$–$Si_3N_4$ Whiskers", vol. 5, No. 5, 1989, pp. 321–326.

J. Homeny et al., Journal of the American Ceramic Society, "Mechanical Properties of $\beta$–$Si_3N_4$–Whisker/$Si_3N_4$–Matrix Composites", vol. 73, No. 11, 1990, pp. 3493–3496.

*Primary Examiner*—James Derrington
*Attorney, Agent, or Firm*—Fish & Richardson PC

[57] ABSTRACT

$Si_3N_4$ based ceramics are prepared by molding, calcining and sintering a powder mixture of columnar-shaped $Si_3N_4$ particles having a particular size, a minor quantity of sintering aids and equiaxed $Si_3N_4$ particles. The ceramics have a structure containing a specific quantity of coarse columnar grains grown from the coarse columnar-shaped particles as seed crystals, and superior in wear resistance, resistance to chipping and thermal resistance, and useful as wear resistant components or cutting tools. The ceramics can be produced without recourse to hot press sintering by normal sintering or sintering under a gas pressure, or further by applying HIP.

7 Claims, 1 Drawing Sheet

5,603,877

METHOD FOR PREPARING SILICON NITRIDE BASED CERAMICS

This application is a continuation of U.S. application Ser. No. 08/173,950, filed Dec. 28, 1993, now abandoned, which is a continuation of U.S. application Ser. No. 07/827,110, filed Jan. 30, 1992, now abandoned.

FIELD OF THE INDUSTRIAL UTILITY

This invention relates to a silicon nitride based ceramics suited as wear resistant components, such as rocker arm tips, nozzles or dies, or as machining tips.

PRIOR ART

For producing tough sintered bodies, various research has hitherto been conducted on composite sintered bodies. For example, research has been conducted on adding particles of different compositions or adding fibers. Among those, the most tough is a whisker-added sintered body prepared by a hot press method, as disclosed for example in JP Patent KOKAI Publication Nos. 59-54677 and 61-274803.

PROBLEMS

However, the sinered bodies prepared by the hot press method using whiskers are costly and consume a large quantity of energy, thus disadvantageous. Besides, the method is highly limitative and inferior in versatility. On the other hand, high temperature and pressure are imposed by the hot press, so that the whiskers are occasionally damaged and deteriorated in quality.

SUMMARY OF THE DISCLOSURE

It is an object of the present invention to provide an improved method for producing sintered bodies of silicon nitride having high strength and toughness and high wear resistance.

Concretely it is a further object of the present invention to produce sintered bodies exhibiting excellent wear resistance and high temperature characteristics comparable to whisker-added sintered bodies prepared by the hot press method, by a method other than the hot press method.

Under those objects, the present inventors have conducted investigations and ultimately arrived at the present invention.

Up to now, various researches have been conducted on the mechanism of increasing toughness of the conventional whisker-added sintered bodies. According to the hitherto accepted concept, the highly tough whiskers play the role of structural beams, that is, exhibit bridging effect, while also partially exhibiting shape effect, that is, crack deflecting effect, provided that tough whisker particles are employed. The present inventors have conducted further detailed investigations into this mechanism and arrived at a conclusion that the effects of the whiskers are not attributable to the strength of the whiskers themselves, but are derived most outstandingly from the size and particle shape of the whiskers. For example, TEM observations have indicated that a large number of defects are present in the whiskers and usually can not be demarcated from abnormally grown crystal grains. Besides, comparison of the effects of addition of the whiskers to a sintered body having a matrix constituted by equiaxed particles, such as $Al_2O_3$, and to a sintered body having a matrix constituted by columnar particles, such as $Si_3N_4$, has indicated that the effects of the whiskers are evidently lower in the latter. The present inventors have reached the following information from the above facts which are in support of the above considerations.

That is, if columnar crystals, similar to the whiskers, are present in a certain proportion in the structure, the effect similar to that of addition of whiskers naturally is produced so that it is not absolutely necessary to add whiskers. For improving the high temperature characteristics, it is necessary to reduce the amount of sintering aids as much as possible. On the other hand, for improving the wear resistance, it is preferred that the grain size of the matrix phase which proves to be matrix in which coarse columnar crystals exist be as small as possible. In sum, a sintered body having a mixed structure of fine equiaxed grains and coarse columnar grains and containing a lesser amount of the grain boundary vitreous phase is most suited as a material having superior wear resistance and high temperature characteristics, such as cutting tools or high temperature structural materials.

Meanwhile, it has been known that, although a sintered body with superior high temperature characteristics may be produced if the sintering aids constituting the grain boundary components are contained in a lesser quantity, sinterability is lowered and grain growth tends to be retarded. However, for producing the above mentioned mixed structure of of fine equiaxed grains and coarse columnar crystals, sufficient grain growth is necessitated. Therefore, a problem of contradiction is presented.

In view of the above, the present inventors have conducted eager searches, and found that, even though the quantity of the sintering aids is small and of the order of 1 to 10 wt %, a structure containing a specific quantity of coarse columnar grains having a specific size may be produced by mixing a columnar-shaped $Si_3N_4$ starting material having a specific size and shape with equiaxed $Si_3N_4$ particles and by sintering the resulting powder mixture in the normal sintering method or under a gas pressure, so that the above mentioned objective of the invention may be achieved.

Thus the present invention provides a method for producing $Si_3N_4$ based ceramics comprising molding and sintering, in an non-oxidizing atmosphere at 1600° to 1900° C., a powder mixture having a composition of 5 to 30 wt % of columnar silicon nitride particles having a particle size of 0.3 to 5 μm in diameter and 1 to 10 μm in length and having an aspect ratio of 2 to 5 (namely, in a range defined by a line A-B-C-D-E-A as shown by hatching in FIG. 1), 1 to 10 wt % of a sintering aid(s), and the balance being equiaxed silicon nitride particles. The resulting ceramics have a structure containing 5 to 40% of coarse columnar grains which have grown in size based on the columnar silicon nitride particles as seed crystals and which are 10 μm to 50 μm in length.

MERITORIOUS EFFECT OF THE INVENTION

The $Si_3N_4$ based ceramics of the present invention exhibit superior properties in the wear resistance and resistance to chipping because it may be improved in the toughness without being lowered in the hardness. Due to an extremely small content of sintering aids, the ceramics of the present invention exhibits a structure containing only a small quantity of vitreous phases in the grain boundary, so that the ceramics are also superior in the thermal resistance. Consequently, the ceramics of the present invention may be advantageously employed for wear resistant components or cutting tools for which the hardness, toughness and thermal resistance are required. The ceramics of the present invention may be prepared not only by the hot press sintering, but also by the normal sintering method or sintering under a gas pressure, and not only with the use of whiskers, but also with the use of fibers provided that the specific size are shape and satisfied, so that they are highly convenient and useful from the viewpoint of cost and energy saving.

BRIEF DESCRIPTION OF THE DRAWINGS

In the following the present invention will be described in more detail with reference to the preferred embodiment referring to the Drawing.

DESCRIPTION OF THE PREFERRED EMBODIMENTS

Figure 1:
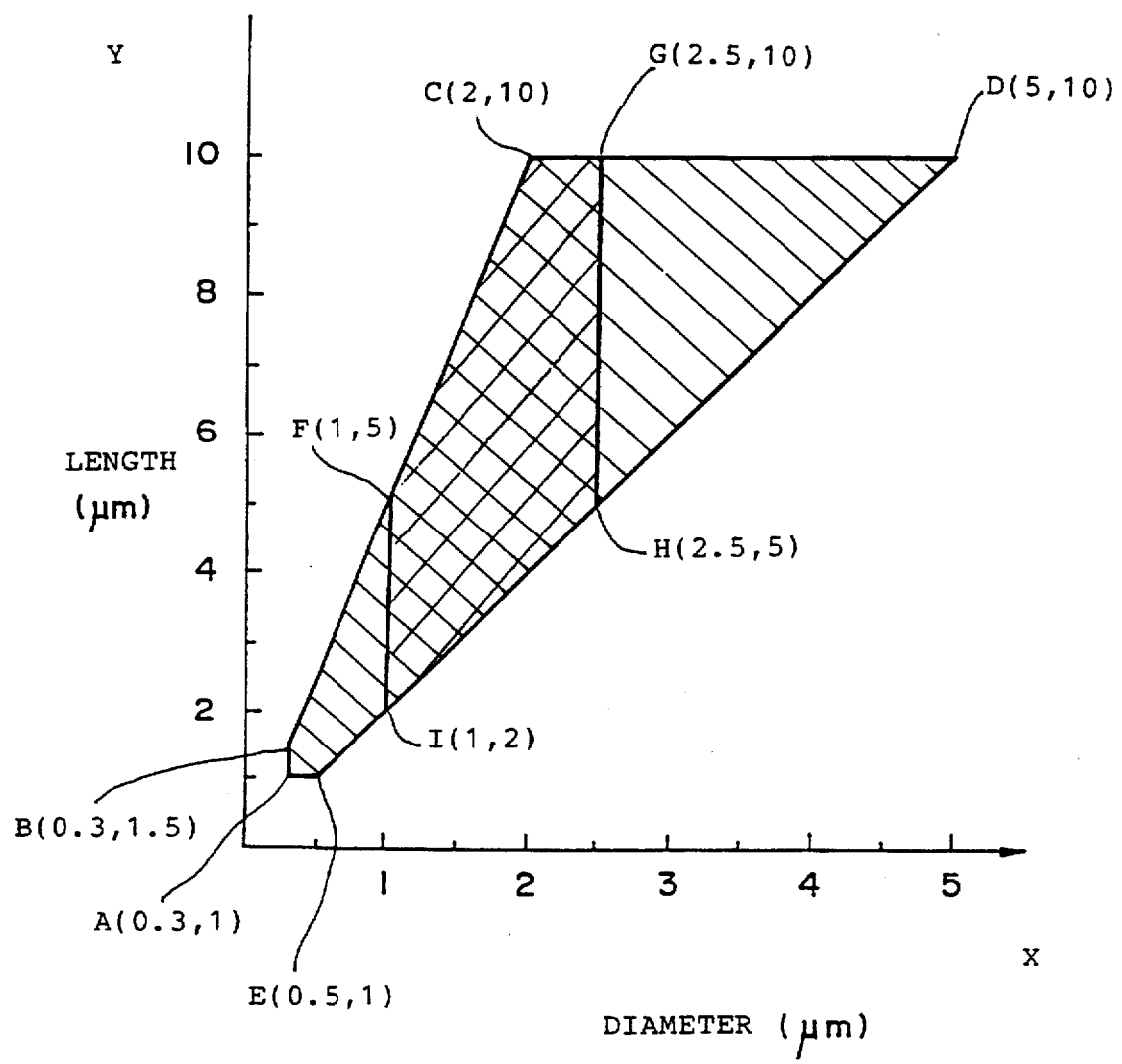
FIG. 1 is a graph showing the size range of columnar-shaped $Si_3N_4$ particles employed in the preparation of ceramics of the present invention, in which the diameter of the columnar-shaped particles is plotted on the abscissa x and the length thereof is plotted on the ordinate y. The points A to H are represented by (x, y) coordinate in micrometers as follows: A(0.3, 1), B(0.3, 1.5), C(2, 10), D(5, 10), E(0.5, 1), F(1, 5), G(2.5, 10), H(2.5, 5) and I(1, 2).

The present invention will be hereinafter explained in detail.

The columnar silicon nitride ($Si_3N_4$) particles employed in the present invention is of a particle size indicated by hatching lines (range A-B-C-D-E-A), preferably by cross-hatching lines (range F-C-G-H-I-F), in FIG. 1, that is, of a length ranging between 1 and 10 μm, a diameter ranging between 0.3 and 5 μm and an aspect ratio ranging between 2 and 5 (the preferred range corresponds to a diameter of 1 to 2.5 μm). It is noted that this conditions should be observed at the stage just before starting the sintering procedure, i.e., namely in the green compact or green molded body.

If the length is less than 1 μm, grain growth to a desired size may not be achieved or abnormal grain growth may be produced due to agglomeration with coarse grains during the sintering process so that a desired structure can not be achieved while the particles are unable to play the role of seed crystals. Conversely, if the particle size exceeds 10 μm, moldability and sinterability are lowered so that it becomes difficult to produce the ceramics by sintering in the normal sintering method or sintering under a pressurized gas, inclusive of HIP sintering, characteristic of the present invention. If the diameter is less than 0.3 μm, fracture tends to be produced during mixing, whereas, if the diameter exceeds 5 μm, the moldability and sinterability are lowered. If the aspect ratio is less than 2, the grain growth as columnar coarse grains is undesirably retarded, whereas, if the aspect ratio exceeds 5, the sinterability and mechanical properties are lowered. Meanwhile, commercially available silicon nitride whiskers or fibers are usually 10 μm or longer and hence need to be previously pulverized in a suitable manner to a predetermined size. These columnar-shaped silicon nitride particles need to be added in an amount of 5 to 30 wt %. This is based on the finding concerning the proportion of the coarse columnar-shaped particles to the equiaxed particles that the proportion of the coarse columnar-shaped grains of 5 to 40% in the resultant sintered body is most preferred for improving toughness of the ceramics without lowering its hardness, such that the proportion of the coarse columnar-shaped particles less than 5 wt % is too small to achieve satisfactory results and the proportion in excess of 30 wt % adversely affects the moldability and sinterability. Whiskers or fibers are preferred as columnar-shaped particles. Although α- and/or β crystal type silicon nitride may be employed if the conditions concerning the shape of the particles such as short fibers are satisfied, β type silicon nitride is more preferred. It is because the β type silicon nitride has the characteristics of being grown preferentially in the longitudinal direction, that is in the direction of the (100) plane, and hence is liable to be grown in the columnar shape.

As the equiaxed silicon nitride particles, the particles not larger than 1 μm in mean particle size and exhibiting an a ratio of not less than 90%, are preferred. The term "equiaxed" herein means that the particle is in the form of a sphere, a regular polyhydron or the like shape.

As the sintering aid, one or more of $Y_2O_3$, AlN, $Al_2O_3$, MgO, $ZrO_2$ and oxides of rare earth elements, such as $Yb_2O_3$, is preferred. The amount of addition of the sintering aid is set to be 1 to 10 wt %. If the amount of the sintering aids is less than 1 wt %, a sufficiently dense structure of the sintered body can not be achieved, whereas, if the amount excess 10 wt %, the amount of the vitreous phase in the grain boundary is increased to deteriorate the high temperature characteristics. In order to obtain a desired sintered product by the normal sintering and pressurized gas sintering, the amount of the sintering aid should be at least 7 wt % (preferably 8 wt %), below which a further HIP treatment is preferred.

On the other hand, for improving the toughness while maintaining the hardness of the sintered product, the quantity of coarse columnar crystal grains present in the sintered structure needs to be in the range from 5 to 40%, as mentioned previously. If the amount of the coarse columnar crystal grains be less than 5%, sufficient effect in improving toughness may not be achieved, whereas, if the amount exceed 40%, the hardness of the sintered product can not be maintained. The length of the coarse columnar-shaped crystal grains is preferably in the range of from 10 μm to 50 μm. If the length exceeds 50 μm, the presence of the coarse columnar crystal grains is rather defective and leads to deteriorated properties of the sintered product, whereas, if the length is less than 10 μm, it may be presumed to contribute to the improvement in toughness only to a lesser extent.

As a sintering atmosphere, a non-oxidizing atmosphere, such a $N_2$ gas or an inert gas, is preferred to prevent oxidation and decomposition of silicon nitride. Although a sintering temperature of 1600° C. or higher is required for providing a dense silicon nitride structure, a temperature so high as to cause active decomposition of silicon nitride should be avoided. Therefore, a sintering temperature exceeding 1900° C. is not preferred. On the other hand, the silicon nitride-based ceramics exhibit good sinterability and a dense structure of the ceramics may be produced by sintering in the normal sintering method, even though the columnar-shaped crystals are contained. However, if sintering under a controlled atmosphere of pressurized gas or sintering by hot isostatic press (HIP) is used, a denser ceramic structure may be obtained as a result of further suppression of the decomposition of silicon nitride. These sintering methods may also be used in combination. It is preferred that the sintering in the pressurized gas is carried out in a nitrogen atmosphere of a pressurized gas pressure, e.g.,at least 0.01 MPa (0.1 atmG), preferably 0.5 to 2 MPa (5 to 20 atmG) for 1 to 4 hours to achieve a relative density of 95% or more up to rearly 100% depending on the kind and amount of the sintering aid. If the density amounts to 95% or less, additional HIP treatment is preferred. The HIP sintering is made at a pressure of 10 to 200 MPa (100–2000 atmG), preferably about 10 to 20 MPa (100 to 200 atmG).

The calcination is done for removing the organic binder as a molding additive, e.g., by heating up to 300° to 800° C. before the sintering, sometimes as a preliminary heating-up process, under a non-oxidizing atmosphere (vacuum or inert atmosphere).

EXAMPLES

Example 1

As a feed material, powders of equiaxed $Si_3N_4$ with a mean particle size of 0.5 μm (α-phase content >90%), powders of AlN with a mean particle size of 0.1 μm, powders of $Al_2O_3$ with a mean particle size of 0.1 μm and powders of $Y_2O_3$, $Yb_2O_3$, MgO and $ZrO_2$, with a mean particle size each of 3 μm, were used. As a columnar-shaped $Si_3N_4$ powdery material, $Si_3N_4$ whiskers with a mean diameter of 2 μm and a mean length of 20 to 30 μm were used and forcibly pulverized to columnar-shaped particles with a mean diameter of 2 μm and a mean length of 8 μm. These starting powders were weighed to obtain compositions shown in Table 1. The starting powders were pulverized and mixed in a ball mill in ethanol for achieving uniform dispersion by disintegrating lumps into powders. Since this process step is aimed mainly at mixing, the columnar-shaped powders were scarcely pulverized and retained their original shape. After the resulting mixed slurry was dried, an organic binder was added to the slurry, and the resulting mixture was mixed thoroughly. The mixed product was passed through a sieve for forming a powder mixture. The produced powder mixture was pressed at a pressure of 98 MPa (1 ton/cm$^2$), calcined by heating up to 600° C. to remove the binder and volatile solvent, and sintered for two hours at 1750° C., in a nitrogen atmosphere maintained at atmospheric pressure. Samples of the produced sintered bodies were further processed by HIP for two hours in nitrogen at 1700° C. at 9.8 MPa (100 kg/cm$^2$). The specific gravity, toughness, hardness etc. were measured and evaluated of the produced samples of the sintered bodies. For measuring the quantity of the coarse columnar-shaped grains in the structure, an image analysis apparatus was used and, from the state of grain size distribution, the volumetric proportion of the grains having the lengths ranging between 10 μm to 50 μm, set as the length range of the coarse columnar-shaped particles, was calculated at a suitable magnification of, e.g., 1,000. The results are shown on Table 1.

It may be seen from Table 1 that the quantity of the coarse columnar grains is markedly influenced by the quantity of the columnar-shaped $Si_3N_4$ particles having a particular size and that, since the quantity of the generated coarse columnar grains is substantially nil in the event that no columnar-shaped particles here been added, the coarse columnar-shaped grains have been grown from the columnar-shaped particles as seed crystals. The present sintered article has satisfactory sinterability, while being superior in the toughness and hardness.

Example 2

Samples of sintered bodies were prepared by the same technique as that in Example 1, except that, in a composition of No. 4 of Example 1, $Si_3N_4$ fibers, having a diameter of 2.5, 4 and 6 μm and a length of about 20 μm, and $Si_3N_4$ whiskers, having a diameter of 0.5, 1.0, 1.5 and 2.0 μm and a length of about 10 to 50 μm, were forcibly pulverized into columnar-shaped $Si_3N_4$ particles of various sizes, which were employed. Evaluation of these samples was made in the same way as in Example 1 and the results are shown on Table 2.

It will be seen from Table 2 that, if the columnar-shaped $Si_3N_4$ particles of various sizes, prepared by previously pulverizing the starting material extensively, are used for preparing samples of sintered bodies, under otherwise the same conditions, the resulting samples exhibit differences in the quantity of the coarse columnar grains in the sintered structure and the sinterability, so that the properties are changed widely. It will also be seen that the samples prepared by using the columnar-shaped $Si_3N_4$ particles having the size and shape defined by the present invention are superior with respect to the wear resistance and resistance to fracture to those prepared using the columnar-shaped $Si_3N_4$ particles outside the scope of the present invention.

Cutting test conditions are as shown in Example 3.

Example 3

Samples of sintered bodies were prepared in the same manner as in Example 1, such as using columnar-shaped $Si_3N_4$ particles having the mean particle size of 2 μm and the mean length of 8 μm, produced by extensively pulverizing $Si_3N_4$ whiskers, except that sintering aids of various compositions shown in Table 3 were used. Cutting tests were conducted on these samples for measuring flank wear thereof. Resistance to chipping was also evaluated of these samples based on the number of machined thread crests. The larger the number of thread crests, the more excellent is the resistance to chipping of the samples.

The conditions of the tests were as follows:

|  | Cutting test conditions | Chipping test conditions |
| --- | --- | --- |
| material to be machined: | FC23; | FC23 |
| cutting speed: | 300 m/min; | 150 m/min |
| feed: | 0.35 mm/rev.; | 0.75 mm/rev |
| depth of cut | 1.5 mm; | 2.0 mm |
| cutting time | 10 seconds; | — |
| [test type]: | dry type | dry type |

It is seen from the results of Table 3 that the $Si_3N_4$ based ceramics of the present invention are superior in the wear resistance and resistance to chipping even with the use of sintering aids of various compositions.

Example 4

Sample Nos. 41 to 47 as shown in Table 4 were prepared substantially in the same manner as in Example 1 subject to observation of relative densities after the primary sintering and after a further HIP treatment, respectively. The amounts of the sintering aids were varied, too, and the proportion of coarse grains of columnar silicon nitride crystals was measured additional to fracture toughness and Vickers hardness. As shown by Table 4, an amount of 6 wt % or more (or 7 wt % or more) of the sintering aids provides a relative density of the primary sintered body under the normal sintering method of at least 96% (or at least 98%) respectively (Nos. 44, 45). 8 to 10 wt % of the sintering aids provides a highest relative density of 99.9% up to 100% (Nos. 46, 47). No. 41C seems to be unsatisfactory due to the ultimate insufficient relative density which should be at least 95%.

Example 5

Sample Nos. 51 to 53 as shown in Table 5 were prepared substantially in the same manner as in Example 1 povided that the normal sintering (primary sintering) was replaced by the pressurized gas sintering under the conditions of 1850° C. for 2 hours in an nitrogen atmosphere at 0.98 MPa (10 kg/cm$^2$).

The results are shown on Table 5 which are satisfactory.

Note that compositions of Nos. 51–53 correspond to those of Nos. 41–43 of Table 4.

Modifications may be done in the art without departing from the concept disclosed herein and scope as defined in the appended claims.

TABLE 1

| Example 1 Sample Nos. | Equiaxed $Si_3N_4$ particles | Sintering aids (wt %) | Columnar $Si_3N_4$ particles (wt %) | Quantity of $Si_3N_4$ grains (%) | Specific gravity (g/cm³) | Fracture toughness (MN/m^{1/2}) | Vickers hardness * (kg/mm²) | Remarks |
|---|---|---|---|---|---|---|---|---|
| 1 | Balance | $3Y_2O_3 + 3Al_2O_3$ | 0  | 1  | 3.33 | 5.0 | 1720 | Comparative |
| 2 | Balance | $3Y_2O_3 + 3Al_2O_3$ | 5  | 7  | 3.33 | 6.5 | 1740 | Inventive |
| 3 | Balance | $3Y_2O_3 + 3Al_2O_3$ | 10 | 15 | 3.32 | 7.3 | 1760 | Inventive |
| 4 | Balance | $3Y_2O_3 + 3Al_2O_3$ | 20 | 28 | 3.28 | 7.8 | 1780 | Inventive |
| 5 | Balance | $3Y_2O_3 + 3Al_2O_3$ | 30 | 37 | 3.21 | 7.4 | 1700 | Inventive |
| 6 | Balance | $3Y_2O_3 + 3Al_2O_3$ | 35 | 43 | 3.12 | 6.2 | 1610 | Comparative |
| 7 | Balance | $3Y_2O_3 + 3Al_2O_3$ | 40 | 48 | 3.09 | —   | 1480 | Comparative |

*1 kg/mm² = 9.8 MPa

TABLE 2

| Ex. 2, Sample Nos. | Equiaxed $Si_3N_4$ particles | Sintering aids (wt %) | Columnar $Si_3N_4$ particles (wt %) | Mean size of Columnar $Si_3N_4$ particles Diameter (μm) | Mean size of Columnar $Si_3N_4$ particles Length (μm) | Mean length of coarse grains after sintering (μm) | Amount of coarse grains (%) | Relative density (%) | Fracture toughness (MN/m^{1/2}) | Vickers hardness * (kg/mm²) | Remarks | Flank wear (mm) | Number of machined thread crests |
|---|---|---|---|---|---|---|---|---|---|---|---|---|---|
| 1  | Balance | $3Y_2O_3 + 3Al_2O_3$ | 20 | 4   | 9   | 18 | 34 | 98.8 | 7.7 | 1730 | Inventive | 0.31 | 15 |
| 2  | Balance | $3Y_2O_3 + 3Al_2O_3$ | 20 | 2.5 | 6   | 28 | 30 | 98.9 | 7.8 | 1780 | Inventive | 0.30 | 18 |
| 3  | Balance | $3Y_2O_3 + 3Al_2O_3$ | 20 | 2   | 9   | 21 | 24 | 99.1 | 7.2 | 1740 | Inventive | 0.33 | 15 |
| 4  | Balance | $3Y_2O_3 + 3Al_2O_3$ | 20 | 1   | 3   | 15 | 18 | 99.3 | 6.8 | 1700 | Inventive | 0.32 | 12 |
| 5  | Balance | $3Y_2O_3 + 3Al_2O_3$ | 20 | 0.5 | 2   | 13 | 15 | 99.0 | 6.7 | 1720 | Inventive | 0.33 | 10 |
| 6  | Balance | $3Y_2O_3 + 3Al_2O_3$ | 20 | 6   | 15  | 20 | 45 | 91.2 | 5.0 | 1540 | Comparative | 0.78 | 6 |
| 7  | Balance | $3Y_2O_3 + 3Al_2O_3$ | 20 | 4   | 12  | 19 | 38 | 93.3 | 5.5 | 1580 | Comparative | 0.66 | 5 |
| 8  | Balance | $3Y_2O_3 + 3Al_2O_3$ | 20 | 1.5 | 9   | 14 | 32 | 94.1 | 6.1 | 1620 | Comparative | 0.59 | 5 |
| 9  | Balance | $3Y_2O_3 + 3Al_2O_3$ | 20 | 1   | 6   | 19 | 17 | 92.8 | 5.8 | 1670 | Comparative | 0.70 | 4 |
| 10 | Balance | $3Y_2O_3 + 3Al_2O_3$ | 20 | 6   | 9   | 17 | 52 | 96.4 | 5.1 | 1570 | Comparative | 0.48 | 3 |
| 11 | Balance | $3Y_2O_3 + 3Al_2O_3$ | 20 | 4   | 6   | 9  | 34 | 97.8 | 5.4 | 1610 | Comparative | 0.41 | 2 |
| 12 | Balance | $3Y_2O_3 + 3Al_2O_3$ | 20 | 1.5 | 2   | 6  | 18 | 99.0 | 6.0 | 1660 | Comparative | 0.35 | 2 |
| 13 | Balance | $3Y_2O_3 + 3Al_2O_3$ | 20 | 0.5 | 0.7 | 7  | 8  | 99.6 | 5.7 | 1680 | Comparative | 0.34 | 1 |

*1 kg/mm² = 9.8 MPa
Nos. 1, 2, 3, 6, 7, 10 and 11 . . . $Si_3N_4$ fiber-based
Nos. 4, 5, 8, 9, 12 and 13 . . . $Si_3N_4$ whisker-based

TABLE 3

| Ex. 3 Sample Nos. | Equiaxed $Si_3N_4$ particles | $Y_2O_3$ (wt %) | $Al_2O_3$ (wt %) | AlN (wt %) | $Yb_2O_3$ (wt %) | MgO (wt %) | $ZrO_2$ (wt %) | Columnar $Si_3N_4$ particles (wt %) | Quantity of coarse grains (%) | Flank wear (mm) | Number of machined thread crests | Remarks |
|---|---|---|---|---|---|---|---|---|---|---|---|---|
| 1 | Balance | 6 | — | — | — | — | — | 20 | 25 | 0.31 | 12 | Inventive |
| 2 | Balance | — | 6 | — | — | — | — | 20 | 27 | 0.28 | 15 | Inventive |
| 3 | Balance | — | — | 6 | — | — | — | 20 | 26 | 0.32 | 13 | Inventive |
| 4 | Balance | — | — | — | 6 | — | — | 20 | 27 | 0.34 | 15 | Inventive |
| 5 | Balance | — | — | — | — | 6 | — | 20 | 32 | 0.36 | 16 | Inventive |
| 6 | Balance | — | — | — | — | — | 6 | 20 | 29 | 0.36 | 14 | Inventive |

TABLE 3-continued

| Ex. 3 Sample Nos. | Equiaxed Si$_3$N$_4$ particles | Y$_2$O$_3$ (wt %) | Al$_2$O$_3$ (wt %) | AlN (wt %) | Yb$_2$O$_3$ (wt %) | MgO (wt %) | ZrO$_2$ (wt %) | Columnar Si$_3$N$_4$ particles (wt %) | Quantity of coarse grains (%) | Flank wear (mm) | Number of machined thread crests | Remarks |
| --- | --- | --- | --- | --- | --- | --- | --- | --- | --- | --- | --- | --- |
| 7 | Balance | 3 | — | 3 | — | — | — | 20 | 30 | 0.32 | 14 | Inventive |
| 8 | Balance | — | 3 | — | 3 | — | — | 20 | 30 | 0.34 | 13 | Inventive |
| 9 | Balance | — | 3 | — | — | 3 | 3 | 20 | 34 | 0.38 | 15 | Inventive |
| 10 | Balance | 0.5 | — | — | — | — | — | 20 | 22 | Chipping | 1 | Comparative |
| 11 | Balance | 7 | 3 | 2 | — | — | — | 20 | 37 | 1.1 | 17 | Comparative |
| 12 | Balance | — | 5 | — | 8 | — | — | 20 | 42 | 0.75 | 15 | Comparative |
| 13 | Balance | 5 | 3 | — | — | — | — | — | 17 | 0.61 | 3 | Conventional |

TABLE 4

| | Under normal sintering | | | | | | |
| --- | --- | --- | --- | --- | --- | --- | --- |
| Example 4 Sample Nos. | Equiaxed Si$_3$N$_4$ particles | Sintering aids (wt %) | Columnar SiN$_3$N$_4$ particles (wt %) | Relative density % | Relative density % (after HIP) | Amount of coarse grains (%) | Fracture toughness (MN/m$^{1/2}$) | Vickers hardness * (kg/mm$^2$) |
| 41C | Balance | 1Al$_2$O$_3$—1Y$_2$O$_3$ | 20 | 91.0 | 93.6 | 22 | — | — |
| 42 | Balance | 2Al$_2$O$_3$—2Y$_2$O$_3$ | 20 | 94.3 | 97.4 | 24 | 5.2 | 1600 |
| 43 | Balance | 3Al$_2$O$_3$—2Y$_2$O$_3$ | 20 | 95.7 | 98.1 | 26 | 7.1 | 1680 |
| 44 | Balance | 3Al$_2$O$_3$—3Y$_2$O$_3$ | 20 | 96.8 | 98.5 | 28 | 7.8 | 1780 |
| 45 | Balance | 3Al$_2$O$_3$—4Y$_2$O$_3$ | 20 | 98.4 | 99.9 | 33 | 7.7 | 1710 |
| 46 | Balance | 4Al$_2$O$_3$—4Y$_2$O$_3$ | 20 | 99.9 | No HIP | 30 | 7.6 | 1740 |
| 47 | Balance | 5Al$_2$O$_3$—5Y$_2$O$_3$ | 20 | 100.0 | No HIP | 37 | 8.2 | 1690 |

C: comparative
*1 kg/mm$^2$ = 9.8 MPa

TABLE 5

| | Under pressurized gas sintering | | | | | | |
| --- | --- | --- | --- | --- | --- | --- | --- |
| Example 5 Sample Nos. | Equiaxed Si$_3$N$_4$ particles | Sintering aids (wt %) | Columnar Si$_3$N$_4$ particles (wt %) | Relative density % | Relative density % (after HIP) | Amount of coarse grains (%) | Fracture toughness (MN/m$^{1/2}$) | Vickers hardness * (kg/mm$^2$) |
| 51 | Balance | 1Al$_2$O$_3$—1Y$_2$O$_3$ | 20 | 96.4 | 98.7 | 29 | 7.6 | 1740 |
| 52 | Balance | 2Al$_2$O$_3$—2Y$_2$O$_3$ | 20 | 98.7 | 99.9 | 33 | 7.7 | 1730 |
| 53 | Balance | 3Al$_2$O$_3$—3Y$_2$O$_3$ | 20 | 99.0 | No HIP | 31 | 7.3 | 1710 |

*1 kg/mm$^2$ = 9.8 MPa

What is claimed is:

1. A method for producing silicon nitride based ceramics comprising:

providing a powder mixture having a composition of 5 to 30 wt % of columnar-shaped silicon nitride particles having a mean diameter of 0.3 to 5 μm and a mean length of 1 to less than 10 μm and having a mean aspect ratio of 2 to 5, 1 to 10 wt % of a sintering aid and the balance being equiaxed silicon nitride particles, molding said powder mixture, and sintering in a non-oxidizing atmosphere at 1600° to 1900° C. under the condition that said columnar-shaped silicon nitride particles substantially grow in length until coarse columnar-shaped grains having lengths of 10 μm to 50 μm are contained in an amount of 5 to 40% in the resulting sintered product to form a sintered ceramic body having improved resistance to wear and fracture, wherein the mean lengths of the resulting grains are at least twice the mean lengths of the columnar-shaped silicon nitride particles of the powder mixture.

2. The method as defined in claim 1, wherein the sintering aid is at least one selected from the group consisting of Y$_2$O$_3$, AlN, Al$_2$O$_3$, MgO, ZrO$_2$ and rare earth oxide.

3. The method as defined in claim 1, wherein the columnar-shaped silicon nitride particles have a length of 1 to 2.5 μm.

4. The method as defined in claim 1, wherein the equiaxed silicon nitride particles have a mean particle size of 1 μm or less with an alpha fraction of at least 90%.

5. The method as defined in claim 1, wherein the columnar-shaped silicon nitride particles are whiskers or fibers of silicon nitride.

6. The method as defined in claim 2, wherein the rare earth oxide is Yb$_2$O$_3$.

7. The method as defined in claim 1, wherein the sintering aid is present in an amount of at least 7 wt %.

* * * * *